US007568445B2

(12) United States Patent
Rosenberger et al.

(10) Patent No.: US 7,568,445 B2
(45) Date of Patent: Aug. 4, 2009

(54) SYSTEM AND METHOD FOR THE HOLOGRAPHIC DEPOSITION OF MATERIAL

(75) Inventors: Brian T. Rosenberger, Aledo, TX (US); William M. Carra, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1217 days.

(21) Appl. No.: 10/010,506

(22) Filed: Nov. 13, 2001

(65) Prior Publication Data
US 2003/0090752 A1 May 15, 2003

Related U.S. Application Data

(66) Substitute for application No. 60/249,678, filed on Nov. 17, 2000.

(51) Int. Cl.
C23C 14/00 (2006.01)
C08J 7/18 (2006.01)
G21H 5/00 (2006.01)
C03C 15/00 (2006.01)
C03C 25/68 (2006.01)

(52) U.S. Cl. .................. 118/50.1; 427/554; 216/65
(58) Field of Classification Search .................. 359/15, 359/1, 35; 430/1, 2; 427/553, 554, 557, 427/558, 596; 216/58–81; 118/50, 50.1
See application file for complete search history.

(56) References Cited

U.S. PATENT DOCUMENTS

| | | | |
|---|---|---|---|
| 4,333,165 A | 6/1982 | Swainson et al. ........... 365/120 |
| 4,340,617 A * | 7/1982 | Deutsch et al. ............. 427/581 |
| 4,752,455 A | 6/1988 | Mayer | |
| 4,950,644 A | 8/1990 | Schultz et al. | |
| 5,017,317 A * | 5/1991 | Marcus ........................ 264/81 |
| 5,039,656 A | 8/1991 | Hidaka | |
| 5,085,166 A | 2/1992 | Oka et al. | |
| 5,169,608 A | 12/1992 | Watabe et al. | |
| 5,364,607 A | 11/1994 | Tebbe et al. | |
| 5,372,089 A | 12/1994 | Yoshida et al. | |
| 5,387,443 A | 2/1995 | Ota et al. | |

(Continued)

FOREIGN PATENT DOCUMENTS

WO  WO 01/79935 A1  4/2001

OTHER PUBLICATIONS

International Search Report mailed Nov. 27, 2002 from the European Patent Office—7 pages.

*Primary Examiner*—Alessandro Amari
(74) *Attorney, Agent, or Firm*—Bracewell & Giuliani LLP

(57) ABSTRACT

An apparatus and method for hologram induced deposition of material for use in the formation of three-dimensional structures is described. An electromagnetic energy source may be directed in the form of a hologram to a process chamber with a medium. The medium may be an organometallic gaseous medium. The hologram may induce the medium to form a solid structure associated with the shape of the hologram. The pressure of the gaseous medium may range from subatmospheric to greater than 100 psi. Alternatively, the medium may be a liquid polymer, a solid particle, or others. The hologram may be formed with an LCD panel or other means. Further, a holographic movie may be projected into one or more mediums to form complex three-dimensional structures.

8 Claims, 6 Drawing Sheets

U.S. PATENT DOCUMENTS

| | | |
|---|---|---|
| 5,468,806 A | 11/1995 | Yamamoto et al. |
| 5,496,595 A | 3/1996 | Ueda et al. |
| 5,497,254 A | 3/1996 | Amako et al. ............... 359/53 |
| 5,539,567 A | 7/1996 | Lin et al. |
| 5,578,350 A | 11/1996 | Mai et al. |
| 5,650,378 A | 7/1997 | Iijima et al. |
| 5,672,211 A | 9/1997 | Mai et al. |
| 5,759,265 A | 6/1998 | Nashimoto et al. |
| 5,786,023 A | 7/1998 | Maxwell et al. |
| 6,054,226 A | 4/2000 | Takeda et al. |
| 6,113,701 A | 9/2000 | Yamazaki |
| 6,312,134 B1 | 11/2001 | Jain et al. |
| 6,312,768 B1 * | 11/2001 | Rode et al. ............... 427/596 |

* cited by examiner

SYSTEM AND METHOD FOR THE HOLOGRAPHIC DEPOSITION OF MATERIAL

CROSS-REFERENCE TO RELATED APPLICATION

This application claims the benefit of priority to U.S. Provisional Patent Application Ser. No. 60/249,678 entitled "System and Method for Holographic Deposition of Material", filed on Nov. 17, 2000, and is incorporated herein by reference in its entirety.

TECHNICAL FIELD OF THE INVENTION

This invention relates generally to material deposition processes, and more particularly, to the field of holographic deposition. Even more particularly, the present invention relates to the processes that cause a phase change to form a three-dimensional freeform shape.

BACKGROUND OF THE INVENTION

The forming of 3-dimensional structures has various applications. These applications include large scale applications such as rapid prototyping and layered manufacturing techniques. Conversely, these applications include small scale applications such as semiconductor manufacturing and micro-electromechanical-machines.

The complex manufacture of systems often requires the very expensive machining, tooling, and fastening of individual parts to form a complex structure. Additionally, the labor involved in these processes is both time consuming and expensive. Furthermore, when these complex structures are created and fastened together, every time a fastener is placed into an object, stress analysis must be performed to ensure that the performance of the part is not degraded by the attachment of the fastener. These complex structures require complex analysis to protect and determine their performance in actual conditions and actual use. The simpler a structure becomes the more easily such a structure may be analyzed and models developed to predict the structure's behavior.

Large scale forming of 3-dimensional structures such as rapid prototyping may take many of various forms. Many typical rapid prototyping techniques involve layered manufacturing techniques for technologies. These techniques often build parts on a layer-by-layer basis. Examples of these techniques include stereo lithography, solid ground curing, selective laser sintering, laminated object manufacturing.

Stereolithography has been previously used to generate three-dimensional prototype parts. Stereolithography allows the formation of parts from CAD-generated solid or surface models. The process of making tooling from original conception through all of the required necessary phases prior to implementation in a manufacturing environment is both time consuming and costly. Since the amount of time that it takes to actually reach the production/manufacturing phase of a product can be directly measured in dollars and cents, reducing this time makes the manufacturing process both more efficient and more profitable. CAD software is used as a method to define both the geometry and dimensional requirements of parts. Historically the data from a CAD file may be electronically transmitted to a stereolithography system. There are several different types of stereolithography systems available, each utilizing its own distinct process depending on such factors as the required model accuracy, equipment costs, model material, type of model, and probably most important, the modeling time. One such stereolithography apparatus consists of a vat of liquid polymer in which there is a movable elevator table/platform capable of moving (lowering) in very precise increments depending on the requirements defined by the type of model that is to be constructed. This system may use a helium/cadmium laser to generate a small but intense-spot of ultraviolet light, which is used to scan across the top of the vat of liquid polymer. This scan is controlled by a computer controlled optical scanning system. At the point where the laser and the liquid polymer come into contact, the polymer is fused into a solid by crosslinking. As the laser beam is scanned across an x-y surface, the model is formed as a plastic object, point by point and layer by layer.

However, the accuracy of the model is limited by the type of photopolymer that is being used and the striations associated with the depth of each layer. As each layer is formed, the elevator platform is then lowered so that the next layer can be scanned. As each additional layer is formed, it then bonds to the previous one and the resulting object is generated by a precise number of successive layers.

At the end of this process, the object can then be removed from the support structure and finished by any number of methods until the surface finish is of the texture that is required. Also, the object can then be used as either a negative or a positive mold from which tooling could be formed.

The disadvantage with stereolithography is twofold. First, stereolithography requires the laser to be scanned. Thus, the three-dimensional object is formed layer by layer and point by point. This scanning process can be time consuming. Secondly, stereolithography has been used on plastic material that is easily modified with ultraviolet light. Typically in such a system, the resulting part is brittle and has very little strength.

Similarly, solid ground curing generally involves using a photopolymer sensitive to UV light. It is, however significantly different from stereolithography. Solid ground curing involves moving a manufactured part from various workstations. In one workstation, the photopolymer is exposed to UV light. The UV light is projected through a mask. In this manner, an entire layer is formed at once. Once the layer has been exposed, the uncured areas filled with residual liquid polymer are replaced by wax. The wax is hardened by a cold metal plate and subsequently the layer is milled to the correct height. The milling station also allows for layers to be removed or undone. Then a new layer of polymer is applied and the part is exposed again to UV light projected through a mask.

Similar to stereo lithography, solid ground curing is often limited to photopolymers. In addition both stereolithography and solid ground curing produce parts with striation associated with the layer-by-layer processing.

One process that has been considered to bring rapid prototyping closer to the idea of actually making parts is laser sintering where one actually deposits the material and then the material is sintered so that one can make a part. In laser sintering, a polymer powder, a ceramic powder, or other materials are spread over the platform. A laser sinters selected areas causing the particles to bond together. In some typical applications, a coated ceramic particle is heated with the laser. The coating melts. As the coating cools, the particles bind together.

Selective laser sintering involves two phase transitions. One from solid to liquid and then back to solid again. In many typical applications, laser sintering involves directing a laser across the area. As such, similar limitations apply as those of stereolithography.

Another technique is that of laminated object manufacturing. In laminated object manufacturing, a foil with an undersurface having a binder is pressed and heated by a roller. The foils is rolled across a previous foil The foil is cut by a laser following the contour of the layer or slice.

To more easily remove the excess material, the exterior of the slice is hatched. This hatching is necessary as the layers are solid. Unlike the fluid based processes, excess material is more difficult to remove. Similar to the processes above, the laminated object manufacturing process is limited by the materials that can be used and by the layer limitations described above.

Each of these layered manufacturing techniques is limited by the materials, layered striations and the accuracy with which they can reproduce an object. Because the techniques involve layering material on top of other layers, the accuracy is limited to the layer of thickness. Often these techniques produce striated objects.

Turning to small scale processes, one process for producing a 3-dimensional structure is photolithography. Photolithography is often used in the manufacturing of semiconductors.

In one typical example of photolithography, wafers of silicon are chemically cleaned to remove particulate matter on the surfaces. After cleaning, a barrier layer, typically silicon dioxide is deposited. A photo resist layer is then applied to the surface. Then, the photo resist is exposed to UV light. The UV light is directed through a mask giving it a pattern. Upon exposure, areas of the photo resist become selectively soluble or resistant to development. In development, less resistant regions of the photo resist are dissolved. This leaves an area in which further deposition of silicon dioxide or metallic compounds may be achieved.

One difficulty with the photolithography process is found in mask alignment. To build a series of 3-dimensional structures, mask must be aligned very carefully. Often the ability to align the masks limits the size of the feature being deposited. Further, the photolithography process involves many steps. These steps require the removal of the wafer from the vessel.

Further, these steps require various and diverse processes including deposition, cleaning, baking, chemical dissolving and others. In many typical applications, these steps and processes require the removal of the wafer from the deposition vessel or chamber. This movement of the wafer exacerbates the problem of aligning the mask. In addition, it increases the time required for the manufacturing of the semiconductor chips.

As such, many typical techniques for forming 3-dimensional structures suffer from deficiencies in producing accurate models and/or excesses in costly tooling or method steps. Many other problems and disadvantages of the prior art will become apparent to one skilled in the art after comparing such prior art with the present invention as described herein.

SUMMARY OF THE INVENTION

Aspects of the invention may be found in a method and system of tool-less manufacture of complex parts and designs. Such a system and method is capable of making a part wherein the tool is actually a software design or data model contained within a computer. Therefore, in the case of the present invention, one must only control the path of a deposition. Such a deposition may be metal, ceramic, non-metallic, organic, polymers or other materials.

Therefore an aspect of the present invention is a process and system wherein a computer directed deposition process enables one to create geometrically complex parts without tooling. The process may reduce the resources and/or tooling required to fabricate parts or complex structures. This tooling for the manufacture of parts is often more expensive and involves more parts than the actual building of a complex structure such as an aircraft or microchip itself. The possibility of dispensing with a large number of small parts requiring no tooling or wherein only one tool is involved allows the possibility that an immense amount of monetary capital can be saved.

Further aspect of the invention may be found in a process which causes a solid, such as a metal, to phase shift to a solid. This may in one embodiment be a gaseous organo-metallic compound condensing into an elemental metal solid structure. However, the invention may take various forms.

This solid may form a three-dimensional freeform shape. The shape may be determined by a hologram and the energy required to dissociate the atoms comprising the solid from a compound is also supplied by the hologram. This may result in a process that requires no tooling, other than the imaging of the hologram to create a solid shape.

In one exemplary embodiment, absorption bands of the gas phase compound being used determine the wavelength of the electromagnetic energy used to create the hologram and dissociate atoms. However, the invention may take other forms such as using specific bands of electromagnetic energy to cure photo sensitive polymers or sinter solid particles.

Elevating the temperature and/or pressure of the gas phase compound prior to the introduction of the hologram into the medium may enhance the deposition rate. The deposition process may occur at the sub-microsecond timeframe upon the introduction of the hologram into the medium. This deposition time may result in the dissociated atoms falling under the influence of gravity.

Another aspect of the invention may be found in the use of a holographic movie. To build a large, complex volume of materials or complex materials themselves may require a time varying hologram or movie to incrementally build this solid shape or to incrementally form the different materials of a composite type structure.

The three-dimensional freeform shape can also be constructed on a platen or support with suitable adjustments to the hologram. Van der Waals' forces may cause the dissociated atoms to conglomerate into a crystal lattice.

Other aspects of the present invention may include variations of the process to permit the density of the solid shape or condensed material to be adjusted dynamically from that of an "aerogel" to a 100% dense object. Further variations include manipulating the precursor materials to permit the condensation of alloys, including a graded or doped alloy. Thermally biasing the process may permit the use of a less energetic method of initiating the deposition. This may include the use of a heated substrate, which if suitably treated would permit the bulk material condensation similar to that and as a replacement for an investment casting.

Another aspect of the present invention may include the development of simple shapes, which are formed using a simplified version of the process. In this embodiment, the hologram is not required but rather by intelligently interfacing energy beams such as laser, electron or ion or suitably focusing and controlled electromagnetic radiation, initiates dissociation and deposition at a desired region.

As such, a system for forming 3-dimensional structures is described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENT

Figure 1:
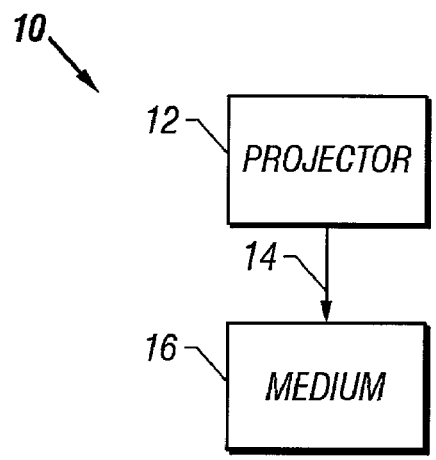
FIG. 1 is a schematic block diagram of a process or facilitating formation of a three-dimensional solid structure, according to the invention.

FIG. 1 is a schematic block diagram of a process or facilitating formation of a three-dimensional solid structure, according to the invention. The system 10 has a projector 12 which projects a hologram of electromagnetic energy 14 into a medium 16. The hologram of electromagnetic energy 14 imparts energy to the medium 16. This energy causes a phase change of the medium whereby a solid free-form, three-dimensional structure may be formed. The free-form structure may take a form associated with the hologram 14.

The projector 12 may take many forms. These forms may include a electromagnetic energy source projecting electromagnetic energy through a film and/or a spatial light modulator, among others. These electromagnetic energy sources may include lasers, heated filaments, charged gas sources, arc sources, optical parametric oscillators and others. Further, these electromagnetic energy sources project a narrow band of electromagnetic energy or may be filtered to project a narrow band of electromagnetic energy, among others.

The film may take various forms. Further, the spatial light modulator may take various forms. These forms may include amplitude-only forms, phase-only forms and/or phase-and-amplitude forms. These spatial light modulators may be controlled by a computer system. The computer system may direct the formation of the holograms by using a predetermined a hologram, by calculating the hologram or through other means. Spatial light modulators may include digital light processors, LCD screens, and spatial light phase modulators, among others.

The medium may take many forms. These forms may include solid particle, liquid, and gaseous mediums, among others. For example, the medium may be a liquid polymer, a sintering ceramic particle, a gaseous metal compound, silane, or others.

Figure 2:
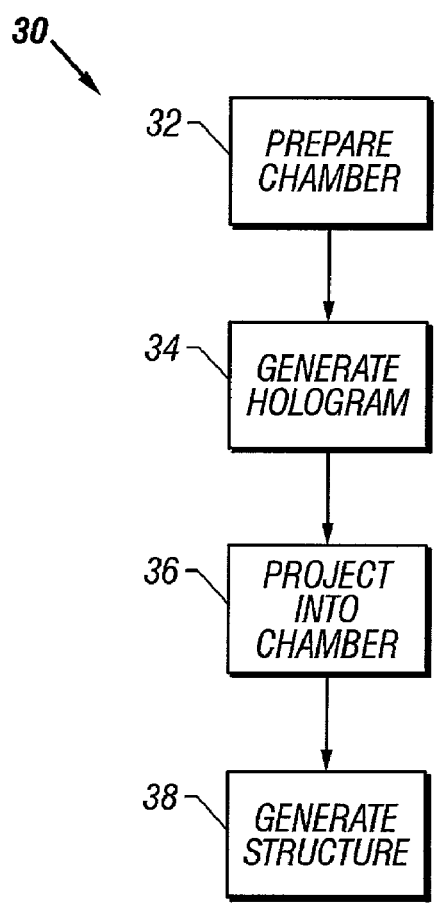
FIG. 2 is a block flow diagram of a method for forming a three-dimensional free-form structure, according to the invention.

FIG. 2 is a block flow diagram of a method performing a three-dimensional free-form structure, according to the invention. The method 30 begins with the preparation of the chamber as seen in a block 32. The chamber may be prepared by filling it with the medium. Next, a hologram of electromagnetic energy is generated as seen in the block 34. Then, as seen in a block 36, the hologram of electromagnetic energy is projected into the chamber and into the medium. As a result, as seen in a block 38, a structure is generated. The hologram imparts energy to the medium whereby the medium undergoes a phase change into a three-dimensional structure. The three-dimensional structure takes on a shape associated with the hologram.

The hologram may be generated before the process, concurrent with the process and others. Further, the method steps may be performed in alternate orders. In addition, the method may comprise a subset of the steps shown, according to the invention.

Figure 3:
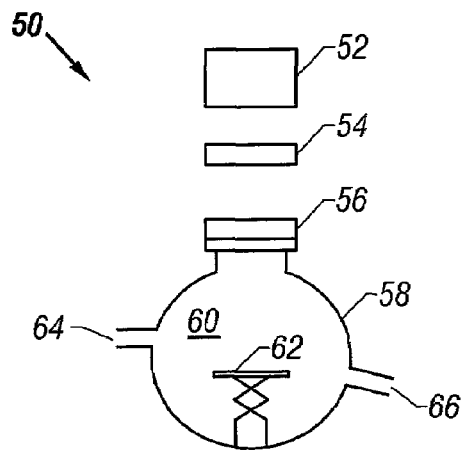
FIG. 3 is a schematic diagram depicting an exemplary embodiment of a system for forming a three-dimensional structure, according to FIG. 1.

FIG. 3 is a schematic diagram depicting an exemplary embodiment of a system for forming a three-dimensional structure, according to FIG. 1. In this exemplary embodiment 50, an electromagnetic energy source 52 directs an electromagnetic energy through a spatial light modulator 54 to form a hologram. The hologram of electromagnetic energy then passes through a window 56 in a vessel 58. The hologram transfers energy to the medium 60 whereby a three-dimensional structure is formed on a platen 62. The three-dimensional structure is associated with the form of the hologram.

In this exemplary embodiment, the medium 60 may, for example, take the form of a gas. This gas may take various forms. These forms may include trimethylamine alane (TMAA), triethylamine alane (TEAA), dimethylethylamine alane (DMEAA), trimethylaluminum (TMA), triisobutylaluminum (TIBA), tetrakis(dimethylamino)titanium (TDMAT), cobalt tricarbonyl nitrosyl, tetraethylorthosilicate (TEOS), and others.

The gaseous medium 60 may be injected into the chamber through an inlet 64. Further, the gaseous medium may be removed from the chamber through an outlet 66. The gaseous medium may be heated or preconditioned to a state such that projection of the hologram of electromagnetic energy initiates formation of the 3-dimensional structure. For example, the medium may be heated with a heating coil.

Further, the pressure of the medium may be controlled. The pressure may influence the rate of deposition. For example, a high pressure medium may facilitate rapid deposition. A pressure between atmospheric and 100 pounds per square inch, for example may aid in forming of large scale parts. However, a low pressure such as a sub-atmospheric pressure may enable more precise deposition. For example, a sub-atmospheric pressured medium may be used to make MEMs or semiconductor structures.

However, the medium may also take various other forms. For example, a liquid medium such as a photopolymer may be introduced into the chamber.

In addition, a series or set of holograms may be projected into the chamber. The platen may move up and down. The series of holograms and the movable platen 62 may function together or separately to generate the three-dimensional structure. In this manner, striations may be reduced or eliminated.

A reduction in striations may be associated with a reduction in the width of layers. The layers produced through the techniques expressed in this application may be smaller than typical techniques. Further, the technique may be adapted to produce near atom width layers for some exemplary embodiments. As such, tooling may not be needed to finish the object. Therefore, the process may reduce the cost and time associated with manufacturing processes.

Many typical techniques include using a scanning light source. However, time and/or cost reductions may be found when using holographic techniques. Replacing the scanning portion of the typical techniques with holographic techniques in conjunction with the present invention may reduce the time required for producing each layer.

In another exemplary embodiment, a set of holograms may be projected into a series of mediums. These mediums may, for example, be selectively introduced into the chamber. In this manner, one or more 3-dimensional structures with varying compositions may be formed.

Figure 4:
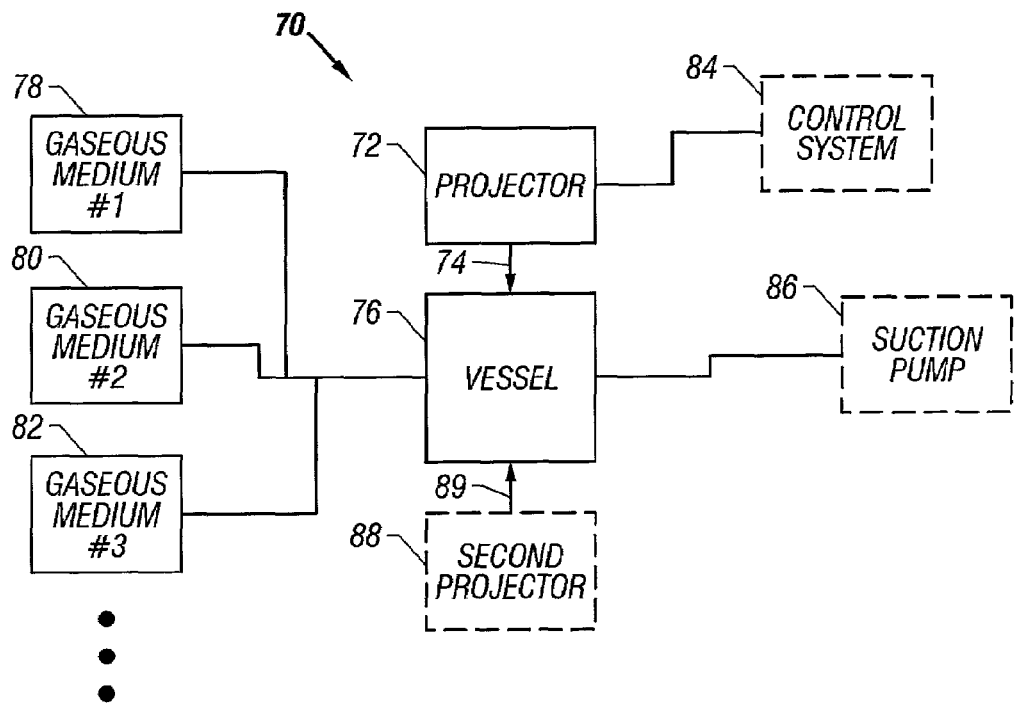
FIG. 4 is a schematic block diagram of another exemplary embodiment of the system according to FIG. 1.

FIG. 4 is a schematic block diagram of another exemplary embodiment of the system according to FIG. 1. The system 70 has a projector 72 which projects a hologram of electromagnetic energy 74 into a vessel 76. The hologram transfers energy to the medium and thereby forms a three-dimensional structure.

In addition to the hologram of electromagnetic energy, a second projector 88 may project a second electromagnetic energy or a second hologram of electromagnetic energy 89. The second electromagnetic energy 89 may function together with the hologram 74 to facilitate the formation or deposition of the three-dimensional structure. The second electromagnetic energy 89 may be projected simultaneously or in series, among others. Further, the hologram 74 may be a series of holograms or a holographic movie. Similarly, the second electromagnetic energy 89 may be a series of holograms or a holographic movie. The series of holograms 74 and second electromagnetic energy 89 may be projected in a coordinated manner.

In addition, a control system 84 may be used to control the hologram 74. The control system 84 may function to time the holographic projection. Further, the control system may function to cause a series of holographs to be projected. In addition, the control system may be coupled to the projector, to the vessel and/or to the second projector. The control system may also function to selectively introduce various mediums.

In an exemplary embodiment, several gaseous mediums 78, 80 and 82 may be used. These gaseous mediums, 78, 80, and 82, may be placed in the vessel together, simultaneously or in series, separately, and/or in various combinations. For example, a hologram of electromagnetic energy may be projected into the vessel containing gaseous medium #1. Gaseous medium #1 may be replaced, and the hologram may be turned off by a suction of the gas through the section pump 86. A second gaseous medium 80 may then be placed in the vessel. Another in the series of holograms may then be projected into the vessel thereby depositing a second layer or another feature of the three-dimensional structure. The second gaseous medium 80 may be replaced by a third gaseous medium 82, and another in a series of holograms 74 may be projected into the vessel to create a further layer or feature of the three-dimensional structure. The process may then continue by replacing the third gaseous medium with a fourth gaseous medium, returning to the first gaseous medium 78, or ending the process, among others.

The vessel or chamber may also be filled with varying gas components. These varying gas components may be instigated to deposit by varying wave lengths. By using a phase spatial light modulator, a hologram with varying wave lengths may be projected into the medium. In this manner, multiple definition compounds may be deposited as a function of position simultaneously.

Figure 5:
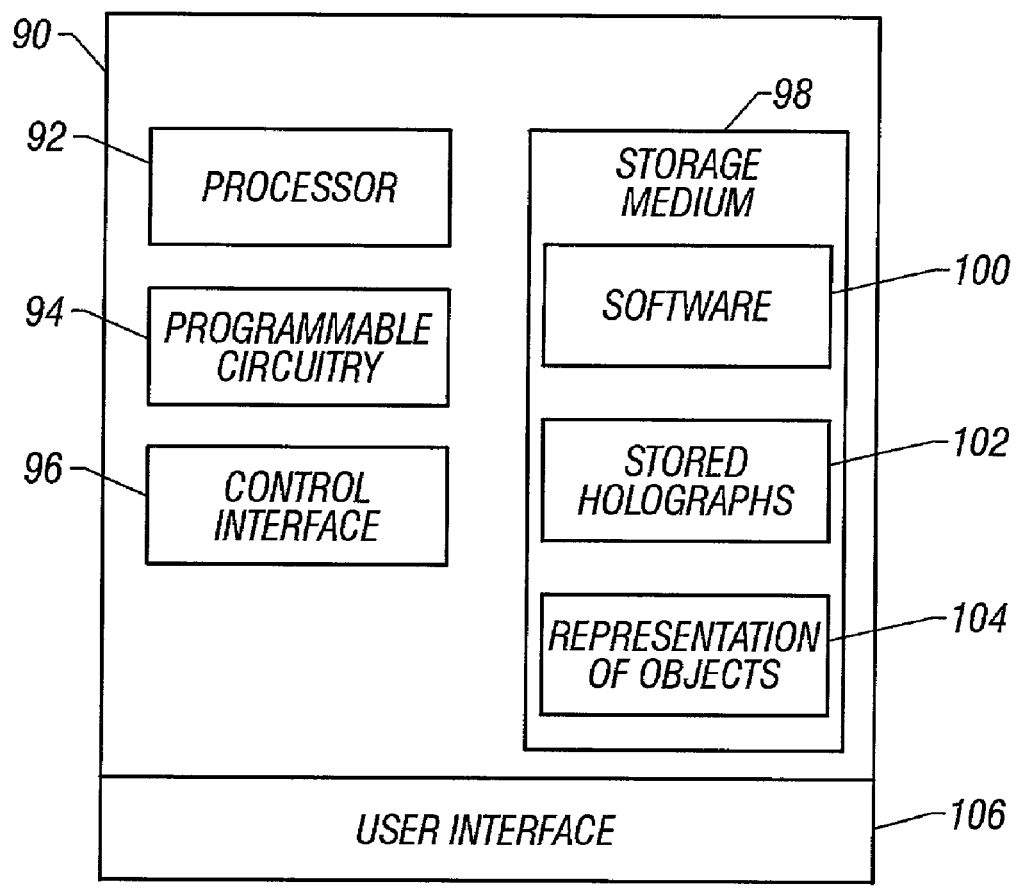
FIG. 5 is a block schematic diagram depicting a control system for use in an exemplary embodiment of the system as seen in FIG. 1.

FIG. 5 is a block schematic diagram depicting a control system for use in an exemplary embodiment of the system according to FIG. 1. The control system 90 may have a processor 92, a programmable circuitry 94, a control interface 96, a storage medium 98, and a user interface 106, among others. A storage medium 98 may hold a software 100, stored holograms 102 or a representation of the three-dimensional structure 104, among others.

The control system 90 may operate to control a spatial light modulator such that a specific hologram or a series of holograms are projected into the medium. The control system 90 may function in such a manner that a processor 92 and programmable circuitry 94 use software to generate a hologram. The holograms may be stored 102 for future use in the storage medium 98 or generated concurrently with the projection of the hologram into the medium. The processor 92 may direct the control interface 96 to operate a spatial light modulator. Further, the processor may use a representation of the desired three-dimensional structure 104 to determine the hologram or set of holograms to be used.

The control system 90 may take many forms. These forms may include a computer, a set of computers, other microprocessor based systems, analog systems, and others.

Programmable circuitry may take many forms. These forms may be programmed through various means. These means may include a keyboard, a handheld device, an interconnected network, a mouse, and others. In this manner, the programmable circuitry may be adapted.

The user interface may take many forms. These forms may include a display and/or an entry device. The display may take various forms including a television, a screen, a computer monitor, and others. Further the entry device may take the form of a keyboard, a handheld device, a mouse, and others.

The storage medium 98 may take many forms. These forms may include a hard drive, a removable drive, a flash memory, a network drive, and others.

The representation of the desired three-dimensional structure or object 104 may take various forms. These forms may include an analog form, a digital form, a computer-aided-drawing representation and others.

Figure 6:
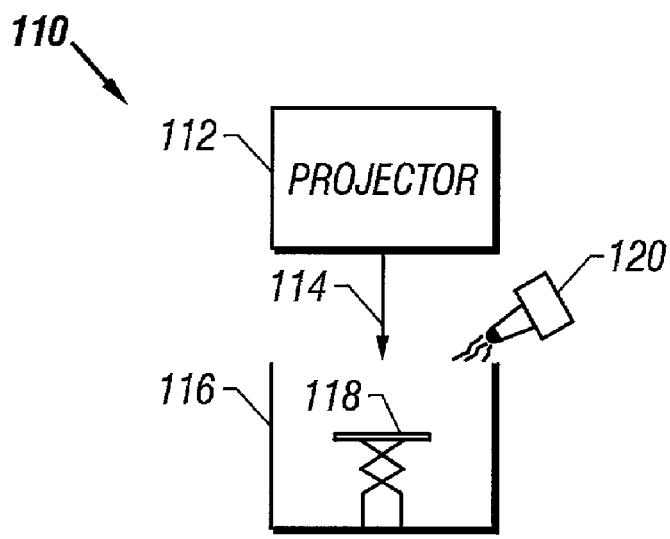
FIG. 6 is a schematic diagram depicting another exemplary embodiment of the system as seen in FIG. 1.

FIG. 6 is a schematic diagram depicting another exemplary embodiment of the invention according to FIG. 1. In the exemplary embodiment 110, the projector 112 projects a hologram of electromagnetic energy 114 or a series of holograms into a vessel 116. In the vessel 116 there may be a movable platen 118. In this embodiment the hologram may be projected into a liquid medium or a powdered medium. Further, the liquid medium or powdered medium may be sprayed with a sprayer 120 about, into or onto the platen or three-dimensional object as the object is being formed.

In one exemplary embodiment, the platform may be moved continuously, vertically, horizontally, or other. The projector 114 may project a holographic movie into a liquid medium. In doing so a three-dimensional structure may be formed. The medium may, however, take a powdered form as well.

In this manner, a three-dimensional structure may be formed without striations or layers or minimal striations or layers. As such, prototyping and structure formation may be accomplished without the need for additional milling or tooling.

Figure 7:
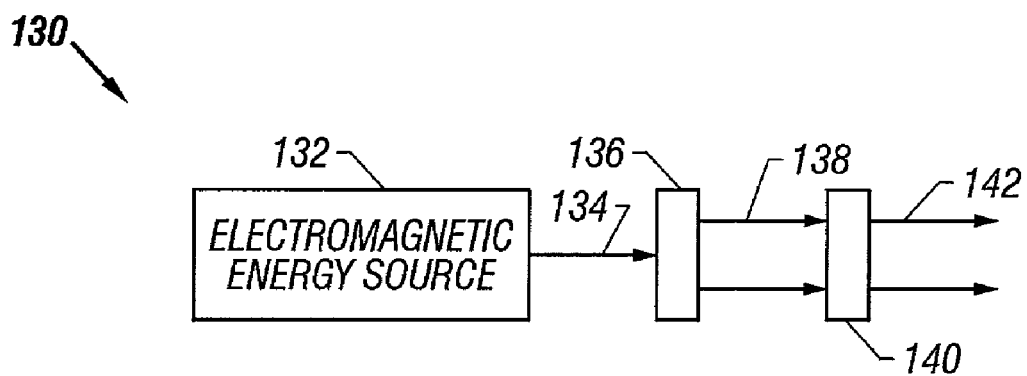
FIG. 7 is a schematic block diagram depicting an exemplary system for making holograms for use by the system seen in FIG. 1.

FIG. 7 is a schematic block diagram depicting an exemplary system for making holograms for use by the system seen in FIG. 1. The system 130 has an electromagnetic energy source 132 which projects a beam of electromagnetic energy 134 through a spatial light modulator 140 to form a hologram of electromagnetic energy 142. For example, the electromagnetic energy source 132 may be a laser generator. The laser generator may generate a beam 134. The beam may go through a collimator 136 and then through the spatial light modulator 140 to form the hologram 142. Further, by using a laser or other monochromatic sources a monochromatic or single-wave length hologram may be produced. Alternately, a phase-only spatial light modulator 140 may be used to produce a hologram 142 which has varying wave lengths in which wave length varies with position.

Holograms may be produced through various means. These means may include film, crystals and spatial light modulators. Spatial light modulators may take various forms. These forms may include amplitude-only forms, phase-only forms and/or phase-and-amplitude forms. These spatial light modulators may be controlled by a computer system. The computer system may direct the formation of the holograms by using a predetermined a hologram, by calculating the hologram or through other means.

Figure 8:
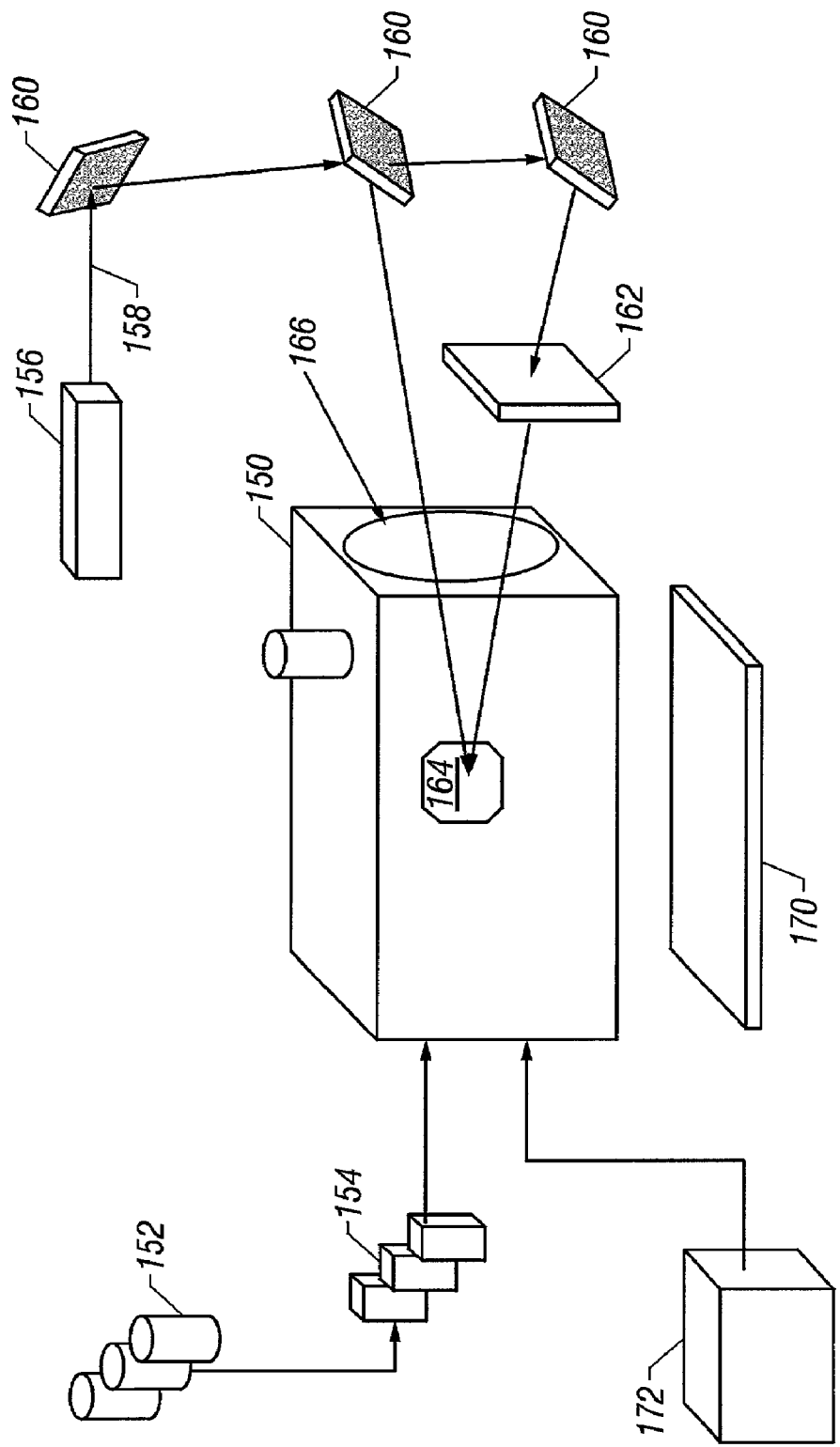
FIG. 8 illustrates one embodiment of the present invention wherein the holographic image is optically imaged within a processing chamber.

FIG. 8 provides another overview of the holographic deposition process of the present invention. As shown a process chamber 150 receives process gas precursors 152 supplied by gas lines and a gas control system 154 to process chamber 150. A laser source 156 supplies a laser beam 158 which is directed via optics 160 and a hologram or computer controlled phase plate 162 to resolve a holographic image 164 at a specific location within process chamber 150. Process chamber 150 may be subatmospheric or above atmospheric pressure. Further, the pressure may be controlled by a pressure control system 172. As such, a window 166 is provided that is transparent to laser light for imaging hologram 164. The hologram provides the energy at a specific location to dissociate the deposited material from the gas precursors. Typical CVD processes are run at relatively low pressures. However, it may be advantageous to raise the pressure within the process chamber 164 to increase the deposition rate. A heat source 170 is another method by which a deposition rate within the process chamber may be increased. Deposition rates may be increased with changes to both the pressure and the temperature within process chamber 150.

The deposition may occur only where the hologram is imaged because the concentration of energy at those points is sufficient to release the atoms from the gas precursors or other precursors, forming the freeform three-dimensional object. This is achieved by directing a light source such as the laser 158. A laser source 158 may be split into two beams by optics 160 whereby one of these beams is directed through a hologram plate 162 such that the two portions of the laser 158 interfere at a particular distance and constructively couple to construct the image.

One aspect found in the present invention is the idea of holography. This differs from a stereolithography process. Stereolithography systems are scanning systems. With holography, instead of imaging a point at a single time and constructing a layer or large structure point by point, it is possible to construct an entire 3-D layer at a time. This allows processing time to be reduced dramatically. Stereolithography systems that, for example, use pulse lasers, deposit at a point. Thereby, point by point, it is possible to construct a line and then a surface volume. Holography reduces and eliminates the need for points or line scans as all the points merge together to form a layer-or a three-dimensional object. The present invention need not be limited to processing individual layers. A low mass very diffuse solid may be imaged entirely as opposed to on a layer by layer basis. One example might be to form aerogels. Alternatively, by raising the pressure of a gaseous environment, it may be possible to image a dense metal within a dense liquid or gas.

Figure 9:
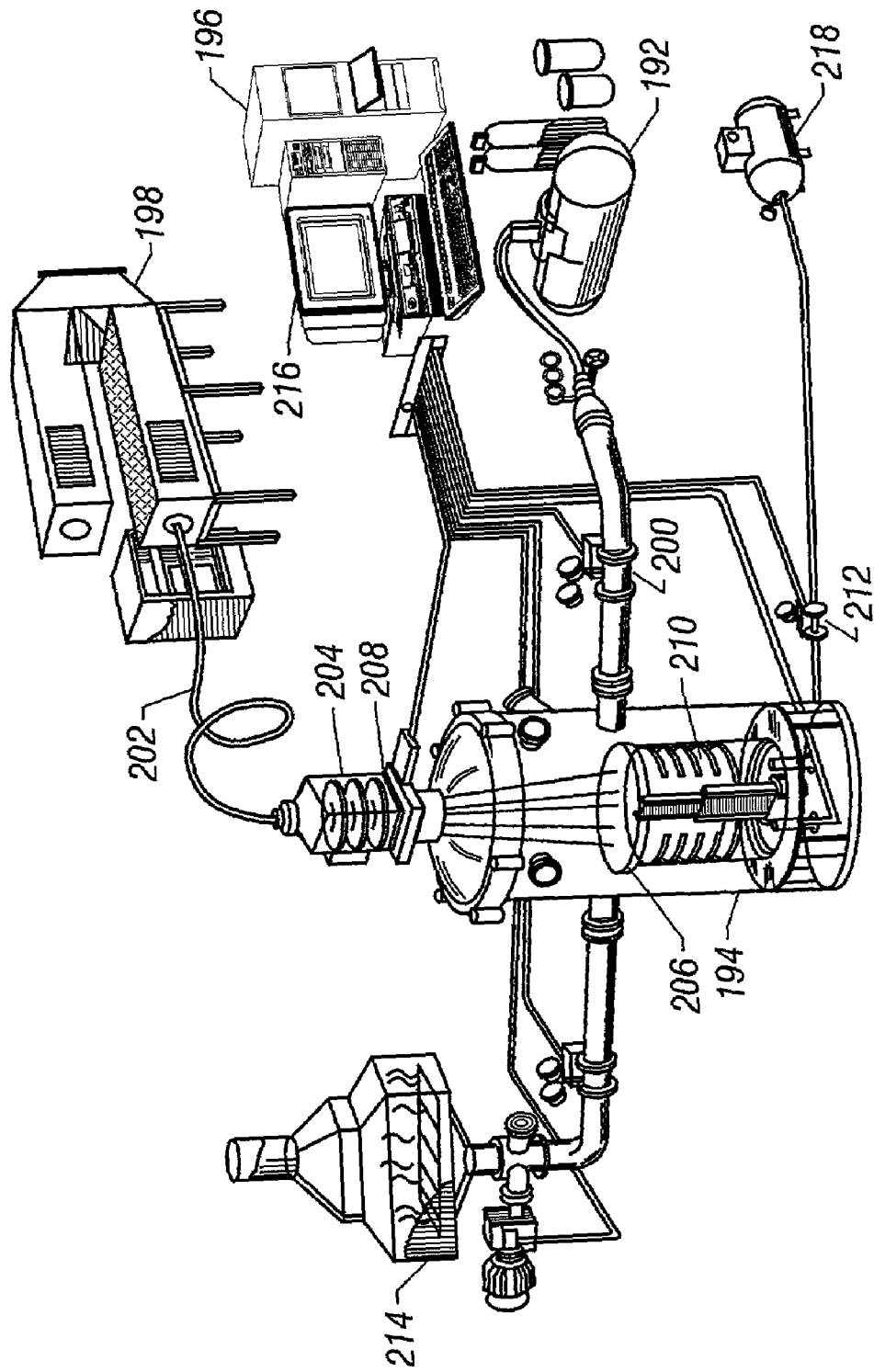
FIG. 9 provides a second embodiment of the present invention where the holographic image is analytically created using a computer driven phase plate.

FIG. 9 illustrates a second embodiment of the present invention where gas storage system 192 contains gas precursors used within process chamber 194. FIG. 9 shows a single gas precursor and gas storage 192, however, any number of gases and gas tanks may be used to supply the gas precursors or other type precursors to process chamber 194. The system may have a solenoid 200 operated by controlled system 196 to regulate the flow of precursors into process chamber 194. One embodiment of the present invention pressurizes processing chamber 194 to 100 psi to take advantage of the higher deposition rates which may be achieved when pressure within the processing chamber is increased. This differs from standard processes used to deposit materials by chemical vapor deposition such as the semiconductor processes, which are all done subatmospheric pressures. There are safety and control reasons associated with reducing the pressure and finer control of the deposition rate within a processing chamber. However, when one is employing a high mass deposition system with a relatively high deposition rate, it may be desirable to increase that deposition rate by raising both the pressure and the temperature. The pressure chosen of 100 psi is an arbitrary pressure and may, in practice, range from subatmospheric pressures to pressures greater than 100 psi. Higher pressures may be chosen for increased deposition rates. The 100 psi pressure was chosen as an example because other typical metal organic gas precursors have the benefit of being operated at 100 psi. As such, their behavior characteristics are understood at that pressure. A laser source 198 supplies a laser via fiber optics 202 through a collimating plate 204. The embodiment shown in FIG. 9 has a working volume of approximately two cubic feet. However, the present invention may not be limited to this volume, rather this process is completely scalable from submicroscopic to super-macroscopic levels. By providing the necessary gas precursors, one can deposit patterned layers without the need for the formation of structures by traditional processes involving selective etches. Returning to the holographic imaging system of the present invention, the collimator optics 204 deliver the laser provided by fiber optics 202. A phase plate 208 is provided to generate the hologram to be imaged on the platen 206 within the processing chamber 194. Phase plate 208 may be a computer driven phase plate to generate the hologram dynamically. Thus, the holographic information may be calculated in the computers associated with control system 196 and expressed in the phase plate 208 to generate the hologram in real time. Thus, it is possible to generate layers of the phase plate dynamically and image them at the working surface of platen 206. To maintain a constant position of the image within the processing chamber, the surface platen 206 may be mounted to a control system capable of manipulating its vertical position within the processing chamber. One such system is the bellows type system 210 provided, or alternatively, by tracking the progress of the three-dimensional freeform image within processing chambers 194. The image of successive layers of the hologram may be imaged at different heights within process chamber 194. One embodiment of the phase plate 208 may be driven to update the image fifty times a second.

The surface platen 206 or stage may have a substrate on it that is slowly lowered as the three-dimensional freeform object is condensed on that stage. This may provide a constant image distance for the phase plate. However, the present invention need not be limited to a constant distance image from the phase plate. Rather, the computer control system 196 may carefully track and calculate the appropriate phase plate to image as the three-dimensional freeform condenses from the gas precursors present in process chamber 194. The process of using a constant image distance is simpler computationally than calculating a dynamic constant image distance. In this manner, from one layer to the next, the stage may be lowered by a layered thickness by a mechanism such as the bellows mechanism shown in FIG. 9.

As the present invention uses chemical vapor deposition, the simplest approach is to use standard metal organic chemistry. In fact, first embodiments of the present invention use aluminum metal organics. These were chosen because they are well understood. However, the present invention need not be limited to this chemistry. More exotic chemistries may be used such that by manipulating the gas precursors it may be possible to deposit diverse or complex layers composing more than one type of material.

Alternatively, one need not use a hologram but one can have interference between multiple beams to have deposition, accrue where these beams constructively interfere. In this way it is possible to have a deposition occur at only a desired location.

One of the unique aspects of the present invention is the computer driven phase plate 208 shown in FIG. 9. For some wavelengths of light, an LCD panel may serve as phase plate 208. Conventional LCD panels can update at 60 hertz, 70 hertz or 50 hertz for example. However, it may be updated more or less. Thus, one can electronically construct a mask for every layer one desires to image by manipulating the computer driven phase plate 208. Use of a computer driven phase plate 208 sensitive to the appropriate wavelengths of light may be used to replace a mask in standard photolithography processes. The phase plate shown in FIG. 9 operates at approximately 400 nanometers. Other such computer driven phase plates need not compose an LCD device. Rather, digital mirror devices, flip-chip mirrors or full wave mixers can be used to create the holographic image. Alternatively, one could expose a hologram piece of film for every frame that is desired to be imaged. However, that is a slow process.

A motor driven working platform 206 shown in FIG. 9 was chosen for simplicity. A bellows surrounds the moveable stage to protect it from the gas precursors. In this instance, the bellows is pressurized to the same pressure as the processing chamber 194 to minimize the forces required to move the work platform. This is controlled by control valve 212 that is directed by control system 196. Pressured gas or a vacuum 218 may be provided to the bellows as required to match the pressure in the processing chamber. However, other methods may be employed to move the structure and platen.

As such, the system may use holograms to produce 3-D objects. The use of holograms may be faster than scanning. Further, the holograms may produce thinner layers than other typical techniques. Furthermore, exemplary embodiments of the holographic technique may produces layers with molecular or atom sized thickness. As such, these layers may not need tooling. Therefore, the holographic techniques may reduce or eliminate the costs and/or time associated with scanning, tooling, and other aspects of manufacutring.

In summary, the present invention comprises a system and method of holographically imaging a three-dimensional freeform object with a deposition system. This system comprises a laser source and means of optically transmitting the laser light to a phase plate. This phase plate may be computer driven and allows one to image through a window in a processing chamber a holographic image at a particular location within the processing chamber. The processing chamber is supplied with gas precursors wherein the gas precursors are dissociated by the locally supplied energy of the imaged hologram. Additionally, the system of the present invention may comprise a computer control system, which will manipulate the supply of gas precursors and the imaging of the hologram in a dynamic manner. A plurality of gas precursors may be used to image layers comprising different materials. Furthermore, the processing chamber may operate at an elevated pressure and/or temperature in order to increase the deposition rate of the material to be dissociated from the gas precursors. An effluent system is included to remove gas byproducts and unused gas precursors from processing chamber 194.

In addition, the system of the present invention may include methods of concentrating the gas precursors at specific locations within the processing chamber 194 in order to increase the efficiency of the material to be dissociated from the gas precursors. By maintaining the richest concentration of the gas precursors locally where the image is formed, unused gas precursors are not inefficiently wasted. In this manner, it may be possible to have a distribution manifold within the processing chamber located approximate to the holographic image such that the gas precursors are efficiently depleted at the holographic image and the gas byproducts are removed by effluent system 214.

Another aspect which may be found in the present invention is that the deposition occurs only where the holographic image is formed. Thus, deposition is not occurring at any other location within processing chamber 194. This is extremely valuable for reducing the build-up of byproducts typically seen in chemical vapor deposition. Often CVD deposition chambers are required to be removed from production in order to etch and clean the chamber from byproduct layers, which typically can cause defects in the formed product. In other words, the present invention provides the advantage of reacting locally where the material is desired to be deposited, rather than a mass deposition over the entire interior of the chamber resulting in an inefficient waste of deposited material.

The efficiency of the system shown in FIG. 8 and FIG. 9 may be a function of the operating pressure in the chamber and the flow rates of the gas precursors to be provided. Efficiency when operating at subatmospheric pressures may be low. By increasing the pressure to 100 psi, the efficiency is increased dramatically. Monitoring devices 216 are shown on processing chamber 194. These may be pressure and temperature monitors or windows such that an observer can view the natural formation of the freeform object within processing chamber 194. Further, a camera can record the deposition.

The system in FIG. 9 shows a single beam of light going through a phase plate 208. Alternately, a holographic image may be created through multiple beams of light. Either way may be used to generate the holographic image within processing chamber 194 but when holograms are generated optically as opposed to analytically, the process may require multiple beams of light. The processing chamber 194 and the stage 206 may be heated to increase the reaction rate. The temperature may be raised such that the gas precursors require a low powered holographic image to dissociate. Thus increasing the efficiency of the deposition. Further, it may be extremely desirable to operate much higher than 100 psi in order to achieve higher deposition rates. The deposition rates associated with the system illustrated in FIGS. 8 and 9 typically deposit grams per minute.

Furthermore, by varying the energy of laser source 198, it may be possible to increase the density of the deposited material by increasing the energy density dynamically of the holographic image. Thus, one may be able to construct not only a three-dimensional freeform but also three-dimensional freeform comprising dynamic densities. Although this deposition rate is slow when compared to standard techniques, a part that is formed at 15 millimeters per minute by holographic imaging would take approximately twenty minutes to build while a sample part formed by traditional scanning techniques may take eight hours. If the layers are deposited in five micron increments, the three-dimensional freeform shape formed will have a mirrored surface. The quality of the surface will depend upon the thickness of the deposited layers. Again, this will differ from conventional stereolithography techniques where the created freeform device was then in turn, finished by hand to achieve the desired surface texture. Although the present invention can be used easily to create metallic shapes, non-metallic materials can be used as well.

Holographically imaging laser energy to form a three-dimensional image can also be applied to other techniques where lasers are scanned across a sintering powder wherein the powder are melted at specific locations to form a three-dimensional object. Instead of scanning, by imaging an entire layer at once, one may increase the deposition or formation rate of a three-dimensional object. In this regards it may be possible to apply holographic imaging to traditional three-dimensional stereolithography.

As described, the present invention may provide a unique method of fabricating components. The present invention provides a process, which causes solids such as metals to condense out of a gas phase compound such as an organometallic compound to form a three-dimensional freeform shape. This shape is determined by a hologram. The energy required to dissociate the atoms forming the solid from the gas phase compound is also supplied by the same hologram. This process requires little or no tooling other than the imaging of the hologram within an atmosphere comprising a gas phase, organo-metallic or other such compound. The wavelength of the light used to create the hologram and dissociate the atoms is determined by the absorption bands of the gas precursors being used. The process may be aided by elevating the temperature and pressure of the organometallic compound prior to introduction of the hologram into the medium. This process will occur quickly upon the introduction of the hologram into the medium and the resulting dissociated atoms may fall under the influence of gravity. To build large volumes of material in complex shapes, it may be required to play a time varying hologram to incrementally build a solid shape. The shape can also be constructed on a platen or support with suitable adjustments to the hologram. In such an instance, individual layers of the three-dimensional freeform are imaged in sequence. In this case, either the focal point is shifted as the three-dimensional freeform is imaged or alternatively, the freeform is moved to provide a constant focal plane for the image.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

As such, a holographic deposition apparatus and method are described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. An apparatus to deposit a three-dimensional structure comprising:
    a holographic projector comprising a laser source supplying a laser beam directed via optics to a phase spatial light modulator to project a series of holograms; and
    a processing chamber, wherein the processing chamber further comprises:
        a window, wherein the window is transparent to the holograms;
        a plane on which the holograms are imaged;
        an inlet to receive gas precursors from a gaseous delivery system, wherein the gas precursors comprise varying gas components, and wherein the hologram imparts energy to dissociate the gas precursors causing dissociated gas precursors to deposit in the plane in a pattern corresponding to the hologram;
        a laser light source to generate coherent collimated electromagnetic energy;
        a computer driven phase plate placed in a path of the coherent collimated electromagnetic energy to the hologram operable to generate holograms at varying wave lengths directed into the processing chamber to deposit multiple definition compounds in the plane; and
        an outlet to exhaust effluent from the processing chamber.

2. The apparatus of claim 1 further comprising a second holographic projector configured to project a second series of holograms into the gaseous medium to function with the first series of hologram.

3. The apparatus of claim 1, wherein the energy to dissociate gas precursors corresponds to a wavelength of electromagnetic energy used to project the series of holograms.

4. The apparatus of claim 1, wherein the energy to dissociate gas precursors corresponds to absorption bands of the gas precursors.

5. The apparatus of claim 1, wherein the gaseous medium pressure within the processing chamber is maintained at about 100 pounds per square inch.

6. The apparatus of claim 1, wherein an intensity of the series of holograms is manipulated to manipulate a deposition rate of the dissociated gas precursors.

7. The apparatus of claim 1, wherein the series of holograms are projected onto a stage within the processing chamber.

8. The apparatus of claim 7, wherein the stage is thermally biased.

* * * * *

UNITED STATES PATENT AND TRADEMARK OFFICE
CERTIFICATE OF CORRECTION

PATENT NO. : 7,568,445 B2 Page 1 of 1
APPLICATION NO. : 10/010506
DATED : August 4, 2009
INVENTOR(S) : Rosenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Seventh Day of September, 2010

David J. Kappos
*Director of the United States Patent and Trademark Office*